Oct. 24, 1972 YUTAKA OKINAKA 3,700,469

ELECTROLESS GOLD PLATING BATHS

Original Filed Oct. 30, 1969 2 Sheets-Sheet 1

INVENTOR
Y. OKINAKA
BY
ATTORNEY

United States Patent Office 3,700,469
Patented Oct. 24, 1972

3,700,469

ELECTROLESS GOLD PLATING BATHS

Yutaka Okinaka, Madison, N.J., assignor to Bell Telephone Laboratories, Incorporated, Murray Hill, N.J.
Continuation of abandoned application Ser. No. 872,610, Oct. 30, 1969. This application Mar. 8, 1971, Ser. No. 122,103
Int. Cl. C23c 3/02
U.S. Cl. 106—1 5 Claims

ABSTRACT OF THE DISCLOSURE

Conditions and bath compositions are given for electroless plating of pure gold and gold alloys on a variety of substrates including ones with gold surfaces. The plating bath contains a gold cyanide complex, and free cyanide is added to stabilize this complex. A borohydride or aliphatic-substituted amine borane is used as the reducing agent and the pH is adjusted by the addition of an alkaline agent. The resulting bath is stable, yields plating rates of typically 0.5 to 3 microns per hour at about 75° C. and plating thickness up to a micron or greater.

BACKGROUND OF THE INVENTION

This is a continuation of application Ser. No. 872,610, filed Oct. 30, 1969, by Yutaka Okinaka.

(1) Field of the invention

The invention is concerned with the composition of electroless gold plating baths and processes for plating gold and gold alloys on certain substrates. This invention is likely to be used extensively for gold plating including the fabrication of electronic components and circuits.

There are essentially three methods of plating gold or gold alloy on surfaces in prevalent use today. These are the electrolytic method, the vapor deposition method and the electroless plating method. The electrolytic process requires elaborate, expensive electronic equipment and does not yield uniform, bright platings on irregularly shaped objects without elaborate precautions. In addition, the plating surface must be electrically conducting and connected to an external source of voltage and current, but adjacent surfaces which are not to be plated must be electrically insulated from the power source. In small and complicated devices, such as printed and integrated circuits, this requirement is often difficult to meet. Vapor deposition also has some inherent disadvantages for many applications. Elaborate high-vacuum equipment and heating filaments are required, and considerable gold is wasted in the evaporation procedure.

(2) Description of the prior art

Present processes for the electroless plating of gold and gold alloys from stable solutions also have serious shortcomings for some applications. These shortcomings are of two kinds. On many surfaces of interest, the platings are too thin; on some metal surfaces such as copper and nickel, the platings are sufficiently thick but interdiffusion makes the surfaces unsatisfactory. It is believed that presently available electroless gold plating processes are not truly autocatalytic, and tests have shown that commercially available baths will not plate gold onto gold surfaces.

SUMMARY OF THE INVENTION

The invention consists of the composition of electroless gold or gold alloy plating baths which are stable and yield, under appropriate conditions, platings of at least 90 percent gold with thicknesses up to one or more microns. The gold is introduced in the bath as alkali-metal gold cyanide. Free cyanide, for example, in the form of NaCN or KCN, is added to increase the stability of the bath and prevent spontaneous liberation of metallic gold in the presence of the reducing agent.

Several closely related reducing agents can be used in this process. A borohydride, particularly an alkali-metal borohydride such as $KBH_4$ or $NaBH_4$ is preferred because it gives high plating rates but other agents such as dimethylamine borane are useful.

A particular advantage of the present process is that gold does plate out on gold surfaces. For this reason, existing gold surfaces which are too thin for some applications can be made thicker by this process. In addition to gold, a large class of elements, alloys and intermetallic compounds are catalytically active including, for example, copper, silver, nickel, platinum and palladium.

Among the alloys of particular interest are permalloy and Kovar which are catalytically active. On some surfaces, an oxide layer must be removed before it becomes active. Other materials can be made catalytically active by evaporating or chemically depositing a catalytically active substance on the surface. Rather intricate designs of gold plating can be made by evaporating a small amount of catalytic metal through a mask and onto a passive surface and then electrolessly plating gold onto the catalytic metal.

DETAILED DESCRIPTION

Figure 1:
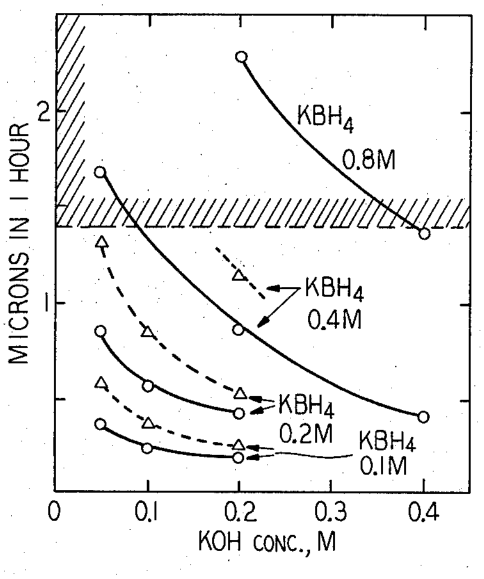
FIG. 1 on coordinates of microns of gold plated in one hour and concentration of KOH is a plot showing the relationship between plating rate and hydroxyl-ion concentration; this relationship is shown for several concentrations of $KBH_4$ and KCN and one concentration of $KAu(CN)_2$.

In order to better understand the invention, the ions of importance in the plating process are listed, and then several ways of introducing these ions into the plating solution are described. The gold is contained in the plating solution in the form of the complex ion $Au(CN)_2^-$. It is essential to the invention that free cyanide ion is added to the bath to stabilize the gold cyanide complex. A reducing agent is used to supply electrons to the oxidation—reduction reaction. A borohydride or aliphatic-substituted amine borane may be used as the reducing agent. A substance is also added to adjust the pH of the plating solution. Increasing the pH of the bath stabilizes the borohydride reducing agent and increases the plating rate with the substituted amine borane. Other ions may be introduced into the solution in order to improve the properties of the plating for particular applications.

The complex ion $Au(CN)_2^-$ is introduced into the solution in the form of an alkali-metal gold cyanide such as $KAu(CN)_2$. The free cyanide is added as an alkali-metal cyanide such as KCN and the pH adjusted by adding an alkali-metal hydroxide such as KOH. The compound $KBH_4$ or $NaBH_4$ are convenient borohydrides to use as a reducing agent and dimethylamine borane is an example of a substituted amine borane.

Other substances may be added to the solution in order to alter the properties of the metal plated out on the substrate. For example, for some applications, a gold alloy might be desirable. The addition of a suitable metal-ion complex would permit a gold alloy to be plated out of the solution. Cobalt, nickel, arsenic, copper, silver and other metals are suitable for gold alloying.

Drawing

Both plating rate and bath stability are of importance in electroless plating processes. Generally, the higher the plating rate the less stable the bath solution. For particular applications, a compromise must be reached between these two quantities.

The plating rate may be varied by changing the composition of the bath or the temperature of the bath. This is illustrated in the drawing for various compositions.

In FIG. 1 the plating rate is shown as a function of hydroxyl-ion concentration for the borohydride reducing agent. Increasing the hydroxyl concentration decreases the plating rate but makes the bath more stable. In the shaded area the bath is rather unstable and of limited usefulness.

Figure 2:
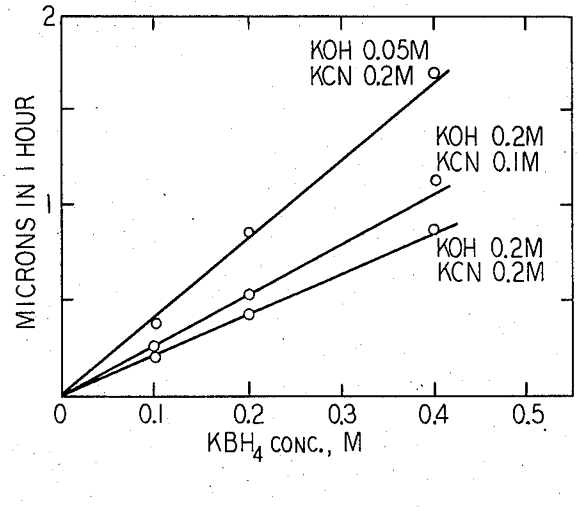
FIG. 2 on coordinates of microns of gold plated in one hour and concentration of $KBH_4$ is a plot showing the relationship between the plating rate and the concentration of reducing agent; this relationship is shown for several concentrations of KCN and KOH and one concentration of $KAu(CN)_2$.

In FIG. 2, the relationship between plating rate and borohydride concentration is shown for several bath compositions. Increasing the borohydride concentration increases the plating rate in a linear fashion at least over the concentration range shown in the figure. Also, increasing the hydroxyl-ion or cyanide-ion concentration decreases the plating rate but makes the bath more stable.

Figure 3:
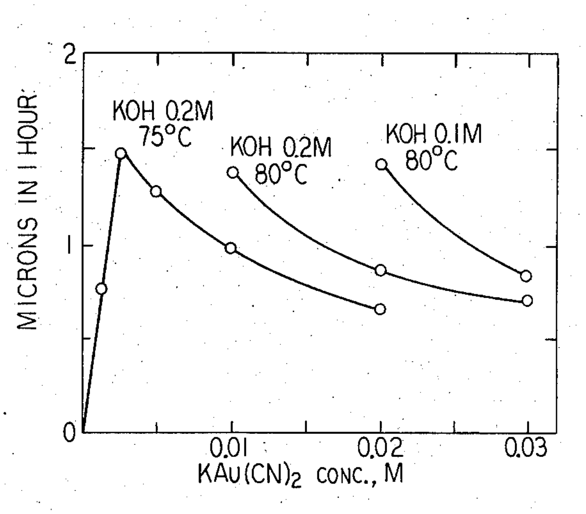
FIG. 3 on coordinates of microns of gold plated in one hour and concentration of $KAu(CN)_2$ is a plot of the relationship between plating rate and concentration of $KAu(CN)_2$; this relationship is shown for two different concentrations of KOH and one concentration of KCN and $KBH_4$.

The effect of $KAu(CN)_2$ concentration on plating rate is shown in FIG. 3. At low concentrations the plating rate increases with increased $KAu(CN)_2$ concentration but above certain concentrations the plating rate decreases with increased $KAu(CN)_2$. This result is rather surprising and a conclusive explanation of it has not been found.

Figure 4:
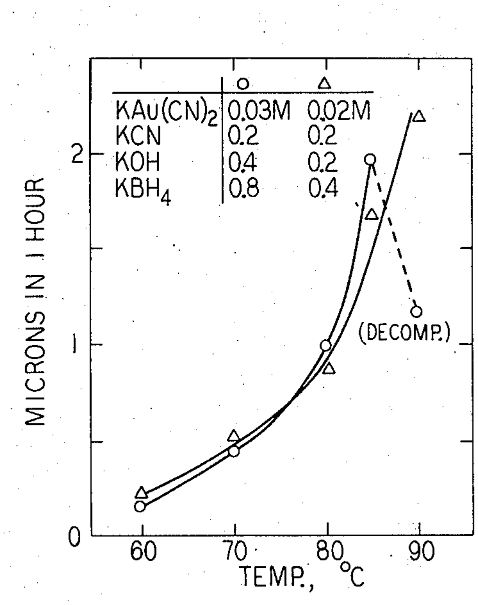
FIG. 4 on coordinates of microns of gold plated in one hour and bath temperature is a plot showing the relationship between plating rate and bath temperature; this relationship is shown for two sets of concentrations of $KAu(CN)_2$, KCN, KOH and $KBH_4$.

The effect of bath temperature on plating rate is shown in FIG. 4. The plating rate increases with increased temperature but as with other parameters which increase plating rate, the bath becomes less stable.

Figure 5:
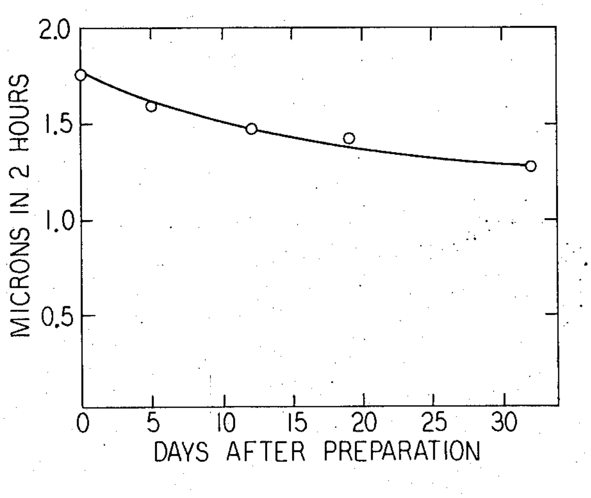
FIG. 5 on coordinates of microns of gold plated in two hours and days after bath preparation is a plot showing the relationship between plating rate and time after bath preparation.

FIG. 5 illustrates the stability of a plating solution which yields plating rates which are useful. This is shown by plotting plating rate against time after the preparation of the plating bath. As can be seen, even after 30 days useful plating rates are still obtained.

COMPOSITION

The invention has been described in general terms as the use of free cyanide ions to stabilize the $Au(CN)_2^-$ complex and the use of a reducing agent such as a borohydride or aliphatic-substituted amine borane. The cation of the borohydride should not be one that interferes with the plating process and an alkali-metal borohydride is preferred. The aliphatic-substituted amine should be reasonably soluble in the plating solution. In this section the specific compositional ranges of particular ingredients are given.

For many purposes the essential ingredients of a suitably stabilized bath may be represented as:

(1) Soluble gold cyanide complex (e.g., $KAu(CN)_2$, $NaAu(CN)_2$, and $LiAu(CN)_2$, 0.0002 M to 0.05 M.

(2) Excess free cyanide ion to stabilize the gold cyanide complex (e.g., KCN, NaCN) in terms of the molar ratio of free cyanide ion to gold cyanide complex. A minimum ratio of 0.05 applies to the entire compositional range of gold complex given above but the maximum ratio is 2000 at .0002 M gold cyanide complex and decreases linearly to 20 as the concentration of gold complex increases to 0.05 M.

For low concentrations of free cyanide, the shelf life of the plating bath is inconveniently short for some applications. In this case, the minimum ratio should be 50 at 0.0002 M gold cyanide complex and should decrease linearly to 0.2 as the concentration of gold complex increases to 0.05 M.

(3) Reducing agent such as a borohydride or an amine borane (e.g., $KBH_4$, $(CH_3)_2NH{\cdot}BH_3$), 0.05 M to 1 M.

(4) Alkaline agent such as alkali-metal hydroxide (e.g., NaOH, KOH) in terms of molar ratio of hydroxyl-ion to reducing agent concentration, 0.1 to 5.

In addition, other reagents may be added to the plating solution in order to improve the properties of the plating for certain applications, for example, certain metal ions may be added to alloy the gold plating.

The reasons for the limits in composition are discussed. The gold cyanide complex extends from a minimum concentration which yields reasonable plating rates to a concentration above which no improvement in bath characteristics is obtained. For the free cyanide ion, the limits of composition are expressed as a ratio of molar concentration of cyanide ion to gold cyanide complex ion. Too low a ratio results in spontaneous reduction of the gold ions. Too high a ratio is not a useful improvement since the stability is already sufficient for practical applications and plating rate is further reduced. Too low a concentration of reducing agent reduces the plating rate to where it is no longer useful and exceeding the maximum concentration makes the plating bath unstable. The hydroxyl ion is used to stabilize the plating bath in the case of the borohydride and to increase the reducing activity in the case of an aliphatic-substituted amine borane. It is appropriate to express the hydroxyl-ion concentration as a ratio of molar concentration of hydroxyl ion to reducing agent. In the case of a borohydride, too low a ratio makes the borohydride unstable; too high a ratio makes the plating rate inconveniently slow. For the substituted amine borane, the ratio extends from a minimum which yields reasonable plating rates to a maximum above which no improvement in bath characteristics is obtained.

OTHER CONSIDERATIONS

The bath composition of this invention can be used to plate gold or gold alloy onto any surface. If the surface is not catalytically active, a small layer of catalytic metal should be put on the surface either by evaporation or well-known chemical procedures. The plating rate can be varied by changing the temperature of the bath. The optimum temperature is in the range of 60° to 95° C. Below this temperature range, the plating rate is inconveniently low; and above the range, the bath is rather unstable. Mechanical stirring also increases the plating rate.

I claim:

1. An electroless plating bath consisting essentially of a soluble gold cyanide complex ion in the concentration range of 0.0002 M to 0.05 M; excess free cyanide to stabilize the gold cyanide complex ion with molar ratio of free cyanide to gold cyanide complex which is from a minimum of 0.05 for the entire compositional range of the gold cyanide complex to a maximum which is 2000 at 0.0002 M gold cyanide complex and which decreases linearly to 20 at 0.05 M gold cyanide complex; a reducing agent selected from the group consisting of alkali-metal borohydrides and dimethylamine borane in the concentration range of 0.05 M to 1 M; and an alkaline agent which yields a molar concentration ratio of hydroxyl-ion to reducing agent in the range of 0.1 to 5.

2. Bath of claim 1 in which the molar ratio of free cyanide to gold cyanide complex has a minimum of 50 at 0.0002 M gold cyanide complex and decreases linearly to 0.2 as the concentration of gold complex increases to 0.05 M.

3. Bath of claim 1 in which the reducing agent is potassium borohydride.

4. Bath of claim 1 in which the reducing agent is sodium borohydride.

5. Electroless plating method comprising wetting a catalytically active surface with a bath consisting essentially of a soluble gold cyanide complex ion in the concentration range of 0.0002 M to 0.05 M; excess free cyanide to stabilize the gold cyanide complex ion with molar ratio of free cyanide to gold cyanide complex which is from a minimum of 0.05 for the entire compositional range of the gold cyanide complex to a maximum which is 2000 at 0.0002 M gold cyanide complex and which decreases linearly to 20 at 0.05 M gold cyanide complex; a reducing agent selected from the group consisting of alkali-metal borohydrides and dimethylamine borane in the concentration range of 0.05 M to 1 M; and an alkaline agent which yields a molar concentration ratio of hydroxyl-ion to reducing agent in the range of 0.1 to 5.

References Cited

UNITED STATES PATENTS

| | | | |
|---|---|---|---|
| 2,976,181 | 3/1961 | Brookshire | 106—1 X |
| 3,032,436 | 5/1962 | Gostin et al. | 106—1 X |
| 3,266,929 | 8/1966 | Lareau et al. | 106—1 X |

FOREIGN PATENTS

| | | | |
|---|---|---|---|
| 16,409 | 10/1962 | Japan | 106—1 |
| 872,785 | 7/1961 | Great Britain | 106—1 |
| 1,022,061 | 3/1966 | Great Britain | 106—1 |
| 1,058,915 | 2/1967 | Great Britain | 106—1 |

LORENZO B. HAYES, Primary Examiner

U.S. Cl. X.R.

117—130 E, 130 B